United States Patent [19]
Aine et al.

[11] Patent Number: 4,733,559
[45] Date of Patent: Mar. 29, 1988

[54] THERMAL FLUID FLOW SENSING METHOD AND APPARATUS FOR SENSING FLOW OVER A WIDE RANGE OF FLOW RATES

[75] Inventors: Harry E. Aine; Barry Block, both of Los Altos, Calif.

[73] Assignees: Harry E. Aine; Barry Block, both of Philo, Calif.

[21] Appl. No.: 892,111

[22] Filed: Aug. 4, 1986

Related U.S. Application Data

[62] Division of Ser. No. 556,800, Dec. 1, 1983, Pat. No. 4,633,578.

[51] Int. Cl.[4] .......................... G01F 7/00; G01F 1/68
[52] U.S. Cl. .......................................... 73/195; 73/204
[58] Field of Search ................. 73/204, 195, 197, 198

[56] References Cited

U.S. PATENT DOCUMENTS

| | | | |
|---|---|---|---|
| 2,972,885 | 2/1961 | Laub | 73/204 |
| 3,352,154 | 11/1967 | Djorup | 73/204 |
| 3,992,940 | 11/1976 | Platzer, Jr. | 73/204 |
| 4,501,144 | 2/1985 | Higashi et al. | 73/204 |

OTHER PUBLICATIONS

Van Riet et al., "Integrated Direction-Sensitive Flowmeter", in Electronic Newsletter, vol. 12, #24, 11/76, pp. 647, 648.

Huijsing et al., "Monolithic Integrated Direction-Sensitive Flow Sensor", in IEEE Trans. on Elec. Devices, vol. ED-29, #1, 1/82, pp. 133–136.

Primary Examiner—Herbert Goldstein
Attorney, Agent, or Firm—Harry E. Aine

[57] ABSTRACT

Miniature thermal fluid flow sensors of the airfoil type are made in batch form by forming the thermal fluid flow sensors on a thin sheet of material and bonding the sheet over an array of duct structures and dicing the individual sensors and duct structures apart. In one thermal flow sensor configuration, a flow heater is dispsoed inbetween first and second thermal flow sensors in heat exchanging relation therewith. A third thermal flow sensor is disposed upstream of the others out of heat exchanging relation with the heater for operation of the heater at a certain temperature above that sensed by the third sensor. In the low flow regime, flow is measured by the difference between the outputs of the first and second sensors, whereas in the high flow regime, the power required to maintain the temperature of the heater serves as a measure of the flow.

6 Claims, 14 Drawing Figures

THERMAL FLUID FLOW SENSING METHOD AND APPARATUS FOR SENSING FLOW OVER A WIDE RANGE OF FLOW RATES

RELATED CASES

This is a divisional invention of the invention of U.S. Ser. No. 556,800 filed Dec. 1, 1983, now U.S. Pat. No. 4,633,578.

BACKGROUND OF THE INVENTION

The present invention relates in general to miniature thermal fluid flow sensors and batch method for making same. Such fluid flow sensors work on the principle that the flow of fluid, in heat exchange relation with a heated sensor, removes heat from the sensor or changes the thermal profile relative to a pair of thermal sensors on opposite sides of the heating element.

DESCRIPTION OF THE PRIOR ART

Heretofore, fluid flow sensors have been proposed wherein a pair of thin film resistors were deposited upon a thermally insulative sheet of plastic material bonded over a frame for supporting the thin plastic material. Current is passed through one of the resistors for heating it to an elevated temperature relative to the other and the two resistors are immersed in the flow of fluid to be measured. The power required for maintenance of a pre-determined temperature difference between the two resistors is evaluated as a measurement of the quantity of fluid flow. Such a flow meter is disclosed in U.S. Pat. No. 4,320,655 issued Mar. 23, 1982.

Others have made similar proposals wherein the thin substrate supporting the resistors is held in a frame structure mounted in streamline frame members and disposed across the fluid conduit within which the measurement is made. Such a disclosure is found in U.S. Pat. No. 4,345,465 issued Aug. 21, 1982.

Others have mounted the thin film sensing resistors on airfoils located proximate flow restrictions for enhancing laminar flow conditions over the sensing resistors. Such a disclosure is found in U.S. Pat. No. 4,317,365 issued Mar. 2, 1982.

It is also known from the prior art to provide thermal sensors by way of wire grids or thin films, one upstream and one downstream of the heating element for detecting the asymmetry of the thermal profile in the vicinity of the heater as a result of the flow of fluid in the duct. Flow meters of this type are disclosed in: U.S. Pat. Nos. 4,332,165 issued June 1, 1982; 4,399,698 issued Aug. 23, 1983; 4,384,484 issued May 24, 1983; 4,332,157 issued June 1, 1982; Sensors and Actuators, Vol. 3 (1982/83), pgs. 17-22 and Sensors and Actuators, Vol. 2 (1981/82), pgs. 3-16.

Others have made devices for and measured thermal conductivity of a flow of fluid by sputter depositing a layer of pyrex glass on a silicon wafer to serve as a carrier for temperature dependent resistors of nickel. The carrier portions of the wafer were then recessed to leave the pyrex carrier supported by a surrounding frame. The resultant detectors were mounted to form a sidewall of the fluid duct. Such a device is described in Scientific American, April 1983, p. 53.

Some of the problems associated with the prior art thermal fluid flow sensors are that with regard to airfoil carriers of the thermal sensors, they have not had a good way to mount the carrier in the duct inasmuch as the wire supports, streamline frames, and the like used to support the airfoil disturb the fluid flow patterns over the airfoil resulting in flow separation, with localized flow reversal in the high flow regime, thereby limiting the operable range of the measurements.

With regard to transverse grid and airfoil type fluid flow sensors, these have not been amenable to the economics of batch fabrication techniques.

With regard to thermal profile asymmetry flow sensors, they tend to be sensitive in the low flow regime but in the high flow regime tend to consume excessive power and/or lose sensitivity.

On the other hand, flow sensors which detect heat loss from a heated element tend to be less sensitive in the low flow regime and more sensitive in the high flow regime.

SUMMARY OF THE PRESENT INVENTION

The principal object of the present invention is the provision of an improved thermal mass flow meter and methods of making same.

In one feature of the present invention, a thermal fluid flow sensor is formed on a thin carrier and the carrier is mounted in self-supporting relation across a fluid duct, whereby mounting frame and wire support structures extending into the fluid flow are eliminated thereby increasing the range of flow over which flow separation can be avoided.

In another feature of the present invention, the thin carrier is apertured to define a transverse grid structure for flow of fluid therethrough and for support of the thermal fluid flow sensors thereon, whereby batch fabrication processes are provided for manufacture of transverse grid-type thermal flow sensors.

In another feature of the present invention, a batch of fluid flow sensors are formed on a thin carrier, the thin carrier is them mounted over an array of half duct structures and the mounted duct and airfoil carrier structures are then diced into individual thermal flow sensor elements.

In another feature of the present invention, a second half duct structure is mounted over a respective one of said diced first half duct structures to define with the first half duct structure a complete duct having the airfoil type fluid flow sensor extending thereacross.

In another feature of the present invention, a flow restriction is molded into the duct proximate the thermal sensing airfoil for extending the operable flow range of the sensor.

In another feature of the present invention, the low flow regime is measured sensing asymmetry of the thermal profile to yield an output determinative of the fluid flow in the low flow regime, in a high flow regime the power fed to a heater to maintain the heater at a predetermined temperature above the ambient is a measure of the fluid flow, whereby the operating range of the thermal fluid flow sensor is increased.

In another feature of the present invention, a batch of thermal sensors are produced by bonding a sheet of thermally insulative material to a substrate wafer, removing portions of the substrate underlying portions of the insulative sheet to produce a batch of devices each having a thin carrier portion of thermally insulated material supported by a frame, forming thermal sensors on the thin carrier portions and dicing the substrate wafers to separate the thermal sensors into individual sensing chips.

In another feature of the present invention, a batch of thermal sensing devices are fabricated by bonding a thin sheet of thermally insulative material over the major face of an apertured wafer such that a batch of devices are made each of which includes a thin carrier portion supported from the lip of a frame, thermal sensors are formed on the carrier portions and the wafer diced to form a batch of individual thermal sensing chips.

In another feature of the present invention, a batch of thermal sensors are produced by recessing a wafer of thermally insulative material from one major face thereof to form thin carrier portions of the wafer material overlying the recessed portions, forming thermal sensing devices on the thin carrier portions and dicing the substrate wafer to separate the individual thermal sensing chips.

Other features and advantages of the present invention will become apparent upon a perusal of the following specification taken in connection with the accompanying drawings wherein:

DESCRIPTION OF THE PREFERRED EMBODIMENTS

Figure 1:
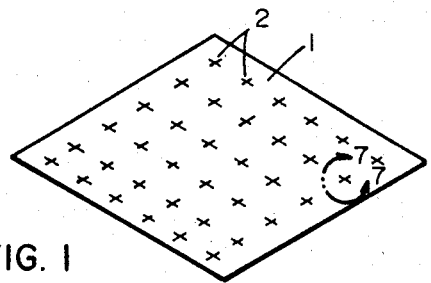
FIG. 1 is a perspective view of a carrier sheet bearing thermal sensors and incorporating features of the present invention.
Figure 7:
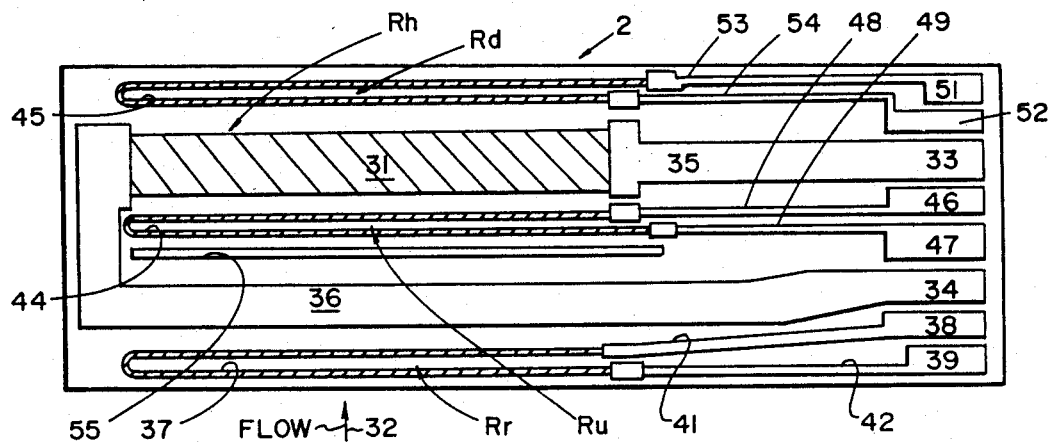
FIG. 7 is an enlarged detail view of a portion of the structure of FIG. 1 delineated by line 7—7 and depicting a thermal flow sensor electrode configuration of the present invention.

Referring now to FIG. 1, there is shown a sheet of thin carrier material 1 having an array of individual thermal flow sensors 2 formed thereon. In a typical example, the carrier sheet is of a thermally insulative material such as pyrex glass, other forms of glass, polyimide resin or other forms of plastic. The sheet 1, depending upon the type of material and its rigidity, may have a thickness varying from between 5 and 120 microns. Also, the sheet 1 need not be of one type of material but may also comprise an apertured substrate member with a very thin thermally insulative layer bonded thereto, such as a glass substrate with a very thin, such as 5 micron thick, layer of polyimide film bonded to the major face of the underlying sheet of glass. In a typical example, the individual thermal sensors 2 have an electrode configuration as shown in FIG. 7, and that configuration will be further described with regard to FIG. 7.

Figure 3:
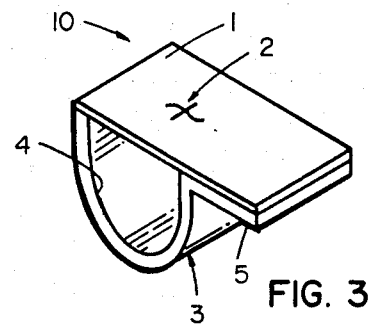
FIG. 3 is an enlarged perspective view of a half duct portion of the structure of FIG. 2 delineated by line 3—3 and supporting the thermal sensor airfoil.
Figure 2:
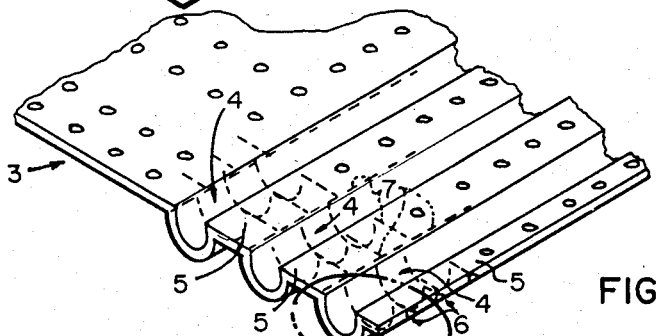
FIG. 2 is a perspective view of an array of molded half duct portions which are to receive and be bonded to the sheet of thermal sensors of FIG. 1.

The carrier sheet 1 bearing the thermal sensors 2, is then bonded as by adhesive such as epoxy, to the major face of an array of molded half duct structures 3. Suitable duct materials include any one of a number of thermosetting plastic materials have high chemical and electrical resistance such as Bakelite. The array of half duct structures 3 each comprise a semi-cylindrical duct portion 4 which is flanged with longitudinally directed flanges 5. The array of flanged duct portions 3 are notched at 6 to define break lines 7 indicated in dotted. The individual semi-cylindrical duct portions with the bonded thermal flow sensor airfoil 1, as shown in FIG. 3, are then broken away from the matrix or array to form individual sensor elements. In addition to breaking along the break lines 7, parts may be separated by cutting with a hot wire.

Figure 4:
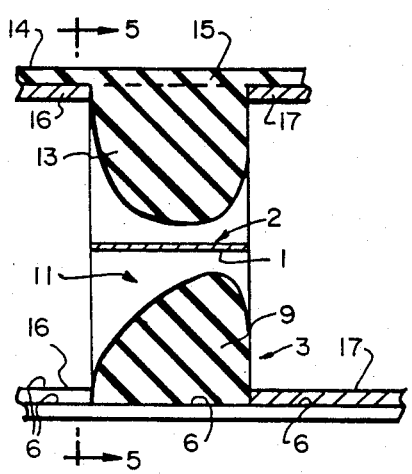
FIG. 4 is an enlarged longitudinal sectional view of a thermal flow sensor incorporating features of the present invention.
Figure 5:
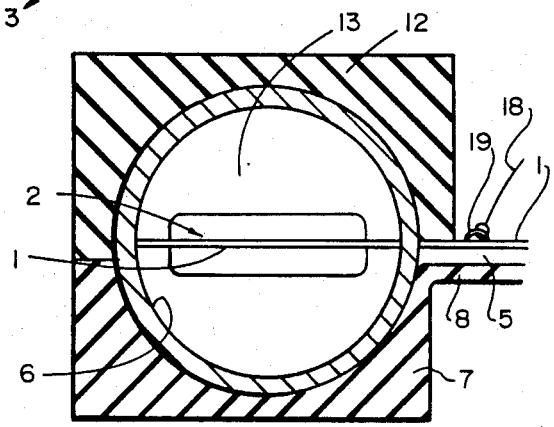
FIG. 5 is a sectional view of the structure of FIG. 4 taken along line 5—5 in the direction of the arrows.

The individual thermal flow sensor units 10 are as shown in FIG. 3 and are assembled into a molded housing of the type shown in FIGS. 4 and 5 to form a completed fluid flow sensor. More particularly, the outer semi-cylindrical portion of the duct 4 nests within a semi-cylindrical recess 6 in a block body portion 7 formed, for example, of thermosetting resin. The lower block body portion 7 includes a flanged portion 8 which receives the similarly flanged portion 5 of the thermal sensor 3.

In one embodiment, the semi-cylindrical duct portion 4 includes a flow restrictor 9 which includes an outwardly flared throat portion 11 disposed facing toward the direction of fluid flow so that fluid passing through the restriction increases its velocity over the airfoil produced by the thin carrier 1. This serves to increase the velocity of the flow in the low flow regime thereby increasing the sensitivity of the thermal fluid flow sensor in the low flow regime. In addition, in the higher flow regimes, it forces the flow to be laminar over the airfoil 1 to minimize the possibility of undesired flow separation and to increase the operable range of flow measurements of the thermal flow sensor.

The block body includes an upper half section 12 having a molded flow restrictor portion 13 forming the mirror image of the lower flared throat portion 11. The upper block body portion 12 includes a pair of axially aligned semi-cylindrical portions 14 and 15 axially aligned with the lower semi-cylindrical bore 6. A pair of tubular sections of conduit or duct 16 and 17 extend axially into the block bodies 7 and 12 from opposite ends to allow connection of the thermal flow sensor 3 of FIGS. 4 and 5 into a tubular conduit, within which the flow is to be sensed. Block body portions 7, 12 and flow sensor 3 together with the tubes 16 and 17 are bonded together via a suitable adhesive as of epoxy, to form a complete device. The upper half 12 of the block body does not extend over the flanged portions 5 and 8 of the thermal sensor 3 and lower block body portion 7 so as to allow electrical connections to be made at 19 via leads 18 to terminals provided on the upper surface of the insulative sheet 1.

Figure 6:
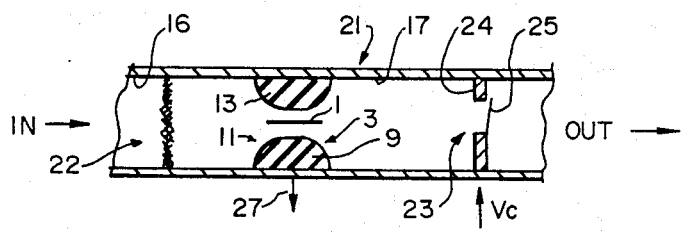
FIG. 6 is a schematic longitudinal sectional view of a mass flow controller incorporating features of the present invention.

Referring now to FIG. 6, there is shown how the thermal flow sensor 3 is incorporated in a conduit together with a valve to form a mass flow controller 21. A screen structure 22 is disposed upstream of the thermal sensor 3 for rectifying the flow of fluid within the conduit 16 as the flow feeds into the throat 11 and 13 of the thermal flow sensor 3. After the flow passes through the sensor, it thence passes through tubulation section 17 to an electrostatic flow control valve member 25 which is pulled down into sealing engagement with the lip of the aperture in the valve plate 24 via a control voltage $V_c$ applied between the cantilever spring 25 and the valve plate 24. A suitable electrostatic valve 23 of this type is disclosed and claimed in co-pending U.S. Pat. Ser. No. 545,907 filed Oct. 27, 1983, now issued as U.S. Pat. No. 4,585,209 on April 29, 1986.

Figure 8:
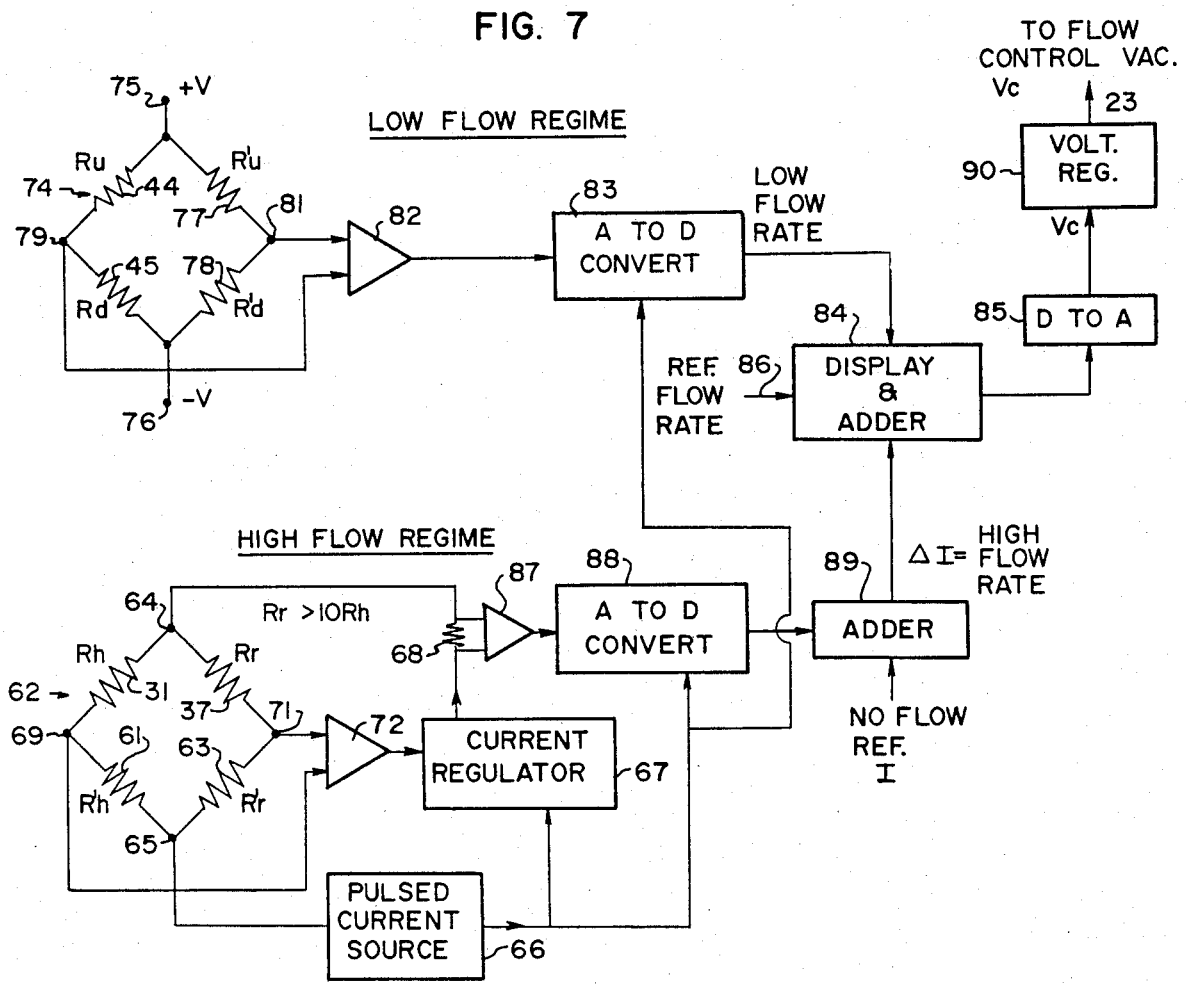
FIG. 8 is a schematic circuit diagram, partly in block diagram form, of a mass flow controller circuit embodying features of the present invention.

In the mass flow controller 21, the thermal flow sensor 3 senses the mass of fluid passing through the thermal sensor 3 and the output is taken from the thermal sensor 3 via output 27 and fed to a suitable controller more fully disclosed in FIG. 8 which produces a control signal applied to the valve 23 for controlling the flow to a desired rate.

Referring now to FIG. 7, there is shown a preferred electrode pattern 2 for the thermal fluid flow sensor 3. The electrode pattern 2 includes a heater resistor $R_h$ 31 with its longitudinal axis oriented transversely to the direction of the fluid flow to be measured 32. The resistor 31 is connected to a pair of terminals 33 and 34 via low resistivity leads 35 and 36, respectively. A reference resistor $R_r$ 37 is disposed upstream of the heater 31 and is connected to terminals 38 and 39 via conductive lead portions 41 and 42. The heating resistor 31 and the reference resistor 37 are preferably formed of the same material having the same temperature coefficients which are selected to be relatively high. A typical resistance material would be, for example, nickel or platinum. The heating resistor 31 is dimensioned so that its sheet resistance is 1/10 or less of that of the reference resistor 37 so that when it is connected in a brdige as shown in FIG. 8 primarily all of the heating current flows through the heating resistor 31 and the reference resistor 37 is heated, if at all, only by a regligible amount.

A pair of temperature dependent resistors 44 and 45 are disposed upstream and downstream respectively relative to the heating resistor 31. Again, resistors 44 and 45 are selected of a temperature dependent resistive material such as nickel or platinum. The upstream resistor 44 is connected to a pair of terminals 46 and 47 via a pair of electrically conductive leads 48 and 49. Similarly, downstream resistor $R_d$ 45 is connected to a pair of terminals 51 and 52 via conductive leads 53 and 54. The conductive lead portions 41, 42, 36, 35, 48, 49, 53, 54 are preferably made of the same material as that of the resistive elements 37, 44, 31 and 45 but have a much thicker deposition of the conductive material so that the resistance of the leads is negligible compared to the resistance of the resistive elements. By making the leads of the same material as that of the resistive elements, undesired electromotive forces are eliminated due to the junctions of dissimilar materials.

In one embodiment, a slit 55 is provided in the airfoil member 1 between the heater 31 and the reference resistor 37 to provide increased thermal isolation between the reference resistor 37 and the heating resistor 31. In this manner, the reference resistor 37 can be employed for sensing the ambient temperature of the fluid flow prior to experiencing heating by the heating element 31. Sensing the ambient allows the heating element 31 to be operated at an elevated temperature relative to the ambient such as +40 degrees C. relative to the ambient temperature.

As an alternative to temperature dependent resistors 44 and 45, these could be replaced by pyroelectric sensors of the type disclosed in U.S. Pat. No. 4,332,157 issued June 1, 1982, the disclosure of which is hereby incorporated by reference. In such a case, the thin carrier sheet 1 would be made of a suitable pyroelectric crystal or plastic material, with an electrical conductive electrode disposed on the opposite side of the sheet 1.

Referring now to FIG. 8, there is shown an electrical circuit incorporating the thermal sensor electrode pattern 2 of FIG. 7. More particularly, heater resistor 31 is connected in series with an equivalent resistor $R^1_h$ 61 in one arm of a Wheatstone bridge 62. The reference resistor 37 and an equivalent resistor $R^1_r$ 63 are series connected in the second arm of the bridge 62. The bridge is fed at input terminals 64 and 65 with a current derived from a pulsed current source 66 which is fed through terminals 64 and 65 via the intermediary of a current regulator 67 and current sensing resistor 68.

The output unbalance signal from the bridge 62 is derived across output bridge terminals 69 and 71 and fed to an input of a differential amplifier 72 for amplification therein and the output thereof is fed to the input of the current regulator 67 for regulating the current fed to the bridge so as to rebalance the bridge.

The resistors of the bridge 62 are chosen of such a value that the bridge will be balanced when the temperature of the heating element 31 is at some pre-determined elevated temperature above the ambient temperature. The value of resistors 37 and 63 are chosen to be at least 10 times the resistance of the heating resistor $R_h$ 31 and its counterpart 61 so that essentially negligible heating is obtained via the current flow through the bridge of the reference resistor 37. Thus, regardles of the temperature of the fluid flow 32, the heating resistor 31 always operates at a predetermined temperature T above the ambient temperature.

The upstream temperature dependent resistor 44 and the downstream temperature dependent resistor 45 are connected in series to form one arm of a second Wheatstone bridge 74 energized with voltage at terminals 75 and 76. A second arm of the Wheatstone bridge 74 includes the series connection of temperature independent reference resistors 77 and 73 each having a value of resistance equal to the quiescent resistor value of the upstream and downstream resistors 44 and 45, respectively.

Temperature dependent resistors 44 and 45, in this bridge configuration, are arranged for sensing asymmetry in the temperature profile in the plane transverse to the direction of elongation of the resistors 31, 45 and 44. More particularly, with no flow (quiescent state), resistor 44 will have the same value as resistor 45 and the output of bridge 74 as taken across terminals 79 and 81 will be of zero value. As the flow increases, the upstream reference resistor 44 will be cooled, thereby lowering its resistance (assuming a positive temperature coefficient) while the downstream resistor 45 will be warmed by the flow of warmed fluid passing over the heating resistor 31, thereby increasing its resistance (for a positive temperature dependence) producing an asymmetry in the temperature profile which is detected by the bridge 74.

The bridge unbalance signal is derived across output terminals 79 and 81 and is fed to a differential amplifier 82 and thence to an A to D converter to derive a digital output signal representative of the flow rate which is thence fed to a display and adder 84 which displays the flow rate measured by the bridge 74.

Although the heater 31 may be operated in the d.c. mode, it is desirable when operating in the low flow regime that the heater 31 not produce convection in the fluid which will produce undesired convection flow currents which would be detected by the bridge 74. Accordingly, the current source 66, which feeds the heating current to the heating resistor 31, is pulsed. The duty cycle is arranged so that the duty cycle of the heater is shorter than the time constant for establishing free convection flow. The A to D converter 83 is synchronized with the pulsed current source 66 so readings of the unbalance signal of the bridge 74 are taken only at periods during which the temperature of the heater has stabilized during the oncurrent pulses.

A reference flow rate digital signal is applied to one input of the adder portion of the display and adder 84 for comparison with the digital output of the A to D converter 83 to derive an error signal which is thence fed to a D to A converter 85 to produce an analog voltage which is fed back via a voltage regulator 90 to the valve 23 for controlling the flow through the mass flow controller 21 to a desired value determined by the reference input at 86.

The thermal sensing bridge 74, which detects asymmetry in the thermal profile around the heater 31, is particularly sensitive in the low flow regime. However, as the higher end of operable flow regime is reached, the bridge 74 becomes less sensitive and at this point it would be desirable to switch the measurement to a sensor which is relatively more sensitive in the high flow regime.

Accordingly, the sensing resistor 68 which senses the heater current flowing to maintain the heater 31 at the pre-determined elevated temperature relative to the ambient is a measure of the heat loss from the heater to the fluid flow. As the fluid flow increases, more and more current is required to maintain the pre-determined temperature difference, i.e., to replace the heat lost to the flow. The output across current sensing resistor 68 is fed to a differential amplifier 87, thence to an A to D converter 88 which converts the analog current signal to digital form. An output from the pulsed current source causes the A to D converter to readout only the current at the time when the heater 31 has stabilized. As an alternative, the current source 66 can be run d.c. in the high flow regime when free convection flow currents are not a problem.

The output of A to D converter 88 is fed to an adder 89 for comparison with a no-flow reference digital value to derive the difference value indicative of the flow rate in the high flow regime. This flow rate signal is then fed to the digital adder and display 84 for comparison with the reference flow rate at 86 to derive a difference digital output fed to the D to A converter 85 and thence to the voltage regulator 90 and the valve 23.

Thus, in the high flow regime, the measurement circuit of FIG. 8 measures the flow by measuring the additional heater power required to maintain the heater 31 at a pre-determined elevated temperature T relative to the ambient temperature as sensed by reference resistor 37. Thus, the composite circuit of FIG. 8 yields a very sensitive measurement of the flow rate in the low flow regime and extends the measurement accuracy well into the high flow regime by sensing the heater power required to maintain the heater 31 at a pre-determined elevated temperature relative to the ambient.

Figure 9:
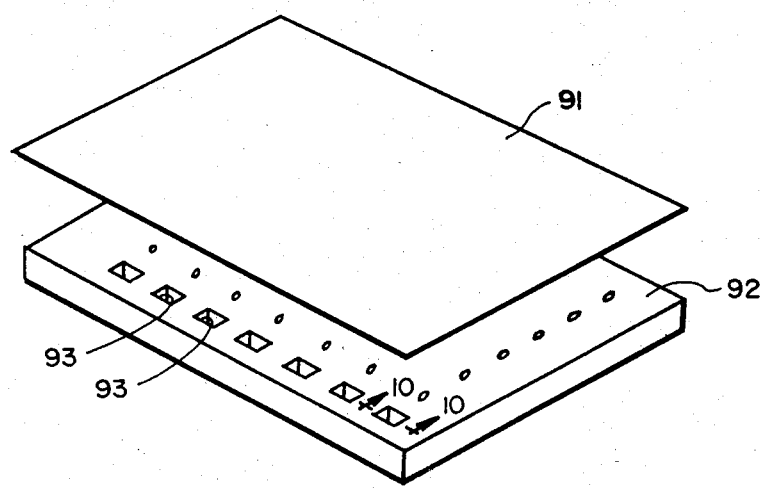
FIG. 9 is an exploded perspective view of an apertured substrate wafer and thin carrier which is to be bonded to the major face of the apertured substrate.

Referring now to FIG. 9, there is shown an alternative batch fabrication method of the present invention. More particularly, a thin sheet of carrier material 91, such as glass, polyimide, pyroelectric crystal or plastic, is bonded overlaying a major face of a substrate wafer 92, as of silicon, glass or polimide. The substrate wafer 92 has an array of apertures 93 etched therethrough to provide frame portions for supporting the thin carrier portion of the sheet 91. The carrier sheet 91 may be bonded to the substrate 92 via any one of a number of suitable methods. When the carrier sheet 91 is of plastic material such as polyimide, it may be bonded by suitable adhesive such as epoxy to the substrate wafer 92. In the case that the carrier sheet 91 is of glass, such as pyrex, it may be bonded to a silicon substrate 92 by an adhesive or by anodic bonding (electrostatic plus temperature). In the case where the sheet 91 is glass and the substrate is glass, the sheet 91 may be bonded to the substrate via a suitable adhesive, as of epoxy, or by heating the assembly to a sufficient temperature, as of 750° C. to 820° C., to fuse the glass sheet to the substrate glass plate.

The apertured substrate plate serves to provide frame members for supporting the very thin carrier sheet, similar to the manner in which a window frame supports a window pane. In a typical example, the substrate wafer 92 may be of a substantial thickness as of 15 mils to 4 mils thick and the sheet material 91 may be from 5 microns to 4 mils in thickness. After the carrier sheet 91 has been bonded to the substrate 92, it may be further thinned by suitable etchants. In the case of glass, a suitable etchant is a mixture of nitric and hydrofluoric acid, there being 30% nitric by volume to 70% hydrofluoric by volume and heated to a temperature of 48° C. This etchant has an etch rate of approximately 13 microns per minute for pyrex glass.

Figure 12:
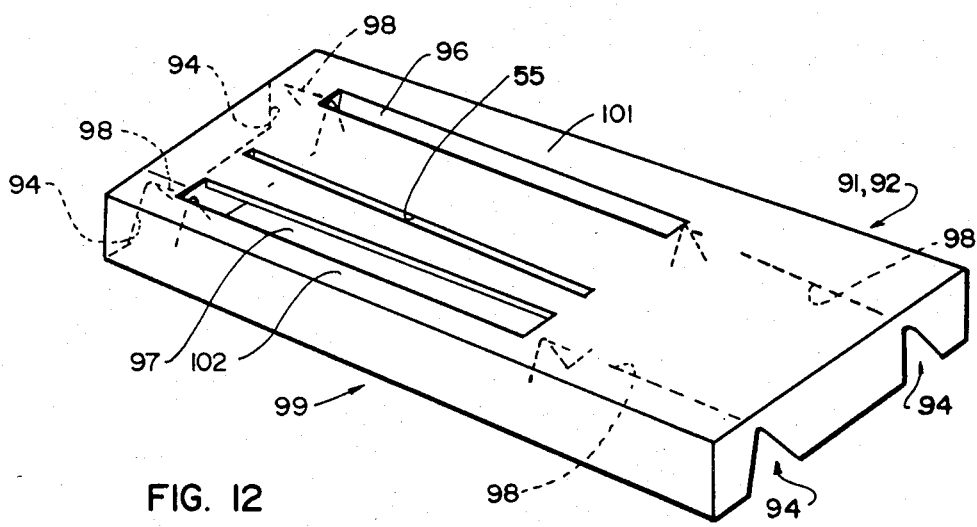
FIG. 12 is an enlarged perspective view of thermal fluid flow sensor chip incorporating features of the present invention.

Once carrier sheet 91 has been bonded to the substrate 92, the composite structure (See FIG. 10) may be processed in the manner of semiconductive wafers by metallizing and etching the major face of the wafer which is to support the electrode structure, such as those shown in FIG. 7. After the electrode patterns have been formed on the major face of the composite wafer, the wafer is diced into the individual sensor chips as shown in FIG. 12. In addition, the substrate wafer 92 is etched or otherwise scribed on the opposite major face at positions as shown at 94 to provide weakened portions in the frame structure of each chip so that portions of the frame can be broken away from the remaining structure after mounting of the chip to opposite lips of its duct structure 4, as shown in FIG. 3. In addition, during the processing of the major face of the wafer, the thin carrier portion 95 may be apertured in a pattern as shown in FIG. 12 to provide the thermal isolation slot 55 and two slots 96 and 97 on opposite sides of the remaining carrier portion and in alignment with break lines 98 formed by the weakened portions 94 of the frame. The frame of the resultant chip 99 is bonded by suitable adhesive, such as epoxy, across the lower duct portion 4 of FIG. 3 and is also bonded to the flange portion 5 of FIG. 3. Then, the side frame portions 101 and 102 are broken away leaving the airfoil sensor of FIG. 7 mounted in self-supporting relation across the duct 4.

Figure 11:
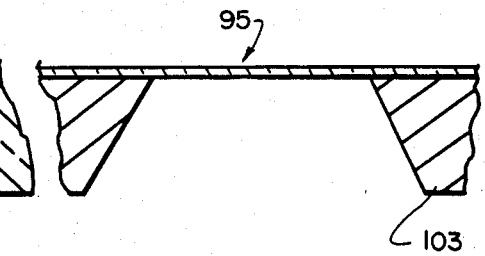
FIG. 11 is a view similar to that of FIG. 10 depicting an alternative embodiment of the present invention.

In an alternative method for batch fabrication of the sensor chips 99 (See FIG. 11), a layer of carrier material is grown or deposited on the major face of an imperforate substrate wafer 103. Suitable thermally insulative layers deposited on the substrate wafer may comprise, for example, silicon dioxide, silicon nitride and polyimide or other organic polymer. The wafer is then etched from the opposite major face of the wafer as shown in FIG. 11 to an etch stop on the thin layer of thermally insulative carrier material 95 thereby forming the array of window frame members 103 holding the thin carrier sheet 95 bearing the thermal sensing electrodes, as indicated in FIG. 7.

Figure 10:
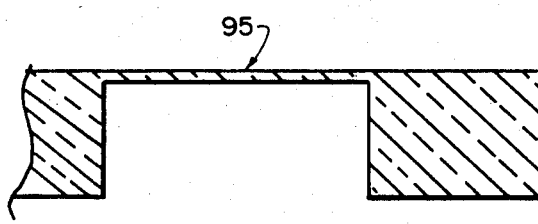
FIG. 10 is an enlarged sectional view of a portion of the bonded structure of FIG. 9 taken along line 10—10 in the direction of the arrows.
Figure 13:
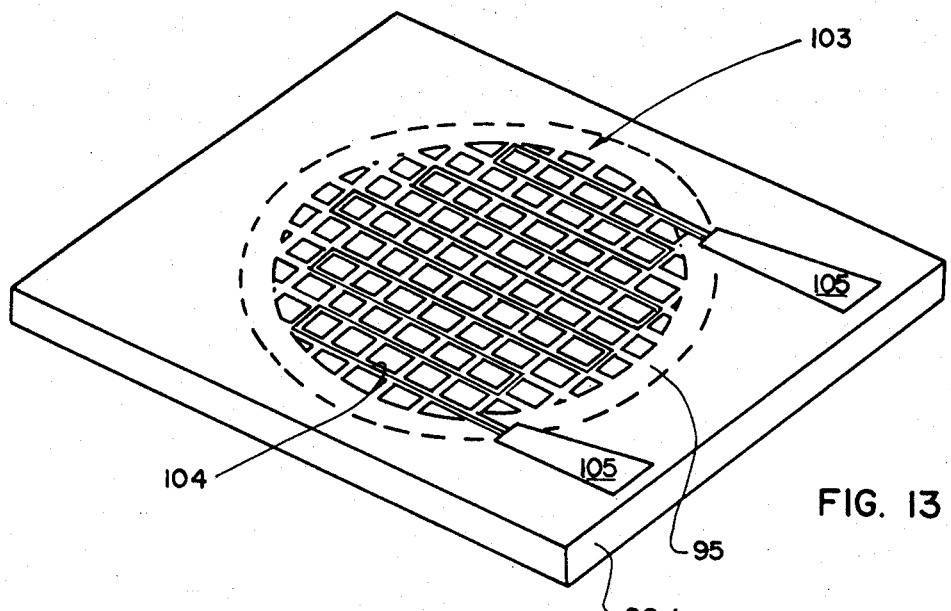
FIG. 13 is a perspective view of an alternative fluid flow sensor chip incorporating features of the present invention and, FIG. 14 is a schematic longitudinal sectional view of an alternative transverse grid thermal mass flow sensor incorporating features of the present invention.
Figure 14:
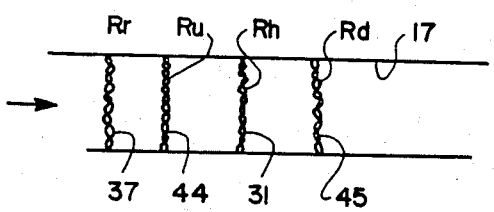

Referring now to FIG. 13, there is shown an alternative thermal flow sensor electrode structure. In this embodiment, the thin carrier sheet of electrically and thermally insulative material, such as sheet 1 of FIG. 1 or sheet 95 of FIGS. 10 and 11, is apertured to define an open grid structure 103. In a typical example, the lattice elements of the grid structure 103 have a thickness as of 5 microns to 120 microns and a width of 0.5 mils to 10 mils. A meandering electrode, such as a temperature dependent resistor 104, is formed as a thin layer on the grid structure 103. In the case of a temperature dependent resistor 104, the resistor layer would have a thickness on the order of 500 to a few thousand Å and is made of a material selected from the group consisting of nickel, platinum and copper. The ends of the meadering resistor 104 are connected to electrically conductive leads 105 which extend out to the edge of the chip to form terminals for making electrical connection to the electrode structure 104. A batch of the electrode structures 104 is made by metallizing, photomasking, and etching a wafer utilizing conventional semiconductive processing technology. In a typical example of a thermal mass flow meter, three of the grid structures are fabricated to form resistors 37, 44 and 45 of the bridge circuits 62 and 74 of FIG. 8. These grids 103 are then mounted across the flow duct 17 in a manner as shown in FIG. 14. One of the girds 103 would have the electrode structure 104 made of a lower resistivity, i.e., 1/10th, so as to serve as a heater 31. The elongated grid elements of the electrode structure 104 are preferably oriented orthogonally relative to those of the heater 31. The composite wafer structure including the individual grid electrode structures 103 are then diced into individual chips as indicated in FIG. 13 and the chips are mounted transversely in the duct 17. The axial spacing along the duct 17 between the various sensing resistor and heating resistors are conveniently determined by the thickness of the substrate 92 or 1.

The various electrode structures 2 forming the thermal sensor and heater elements may be passivated using any one or more of the conventional semiconductor passivating techniques such as sputtered pyrex or low temperature chemical vapor depositon of silicon dioxide and silicon nitride. Other suitable passivating techniques include depositing thin films of organic polymeric material such as polyimide.

The advantages of the present invention include: batch methods for fabricating thermal flow sensors thereby reducing the cost; self-supporting thermal flow sensor structures thereby simplifying the sensors and allowing operation over a wider range of flow rate; and improved sensor configurations combining sensitivity in the low flow regime with sensitivity in the high flow regime to create a wider dynamic sensing range.

What is claimed is:

1. In a method for sensing the flow of fluid within a channel, the steps of:
   disposing a heater in heat exchanging relation with the fluid in the channel for heating the fluid flowing in the channel;
   disposing first and second thermal sensors in heat exchanging relation with the heater and with the flow of fluid in the channel;
   said first thermal sensor being disposed upstream of said second thermal sensor so that flow of fluid in the channel will cool the first thermal sensor more than said second thermal sensor;
   disposing a third thermal sensor in said channel in heat exchanging relation with the fluid in said channel and substantially out of heat exchanging relation with said heater for sensing the ambient temperature of the fluid in said channel;
   employing the output of said third thermal sensor to control the temperature of said heater to a predetermined elevated temperature relative to the ambient temperature of the fluid as sensed by said third thermal sensor;
   comparing the output of said first and second thermal sensors to derive an output representative of the rate of fluid flow in said channel for flow rates up to a certain predetermined first flow rate; and
   measuring an electrical quantity which is a function of the electrical power dissipated in said heater to derive a second output representative of the rate of fluid flow in said channel for a second flow rate above said first flow rate.

2. The method of claim 1 including the step of supporting said heater and said first, second and third thermal sensors on a common carrier.

3. The method of claim 2 including the step of aperturing said carrier in the region thereof inbetween said first and third thermal sensors for thermally isolating said third thermal sensor from said heater.

4. In a fluid flow sensor:
   heater means disposed in heat exchanging relation with the fluid in a channel for heating fluid flowing in the channel;
   first and second thermal sensor means disposed in heat exchanging relation with said heater means and with the flow of fluid in the channel;
   said first thermal sensor means being disposed upstream of said second thermal sensor means so that flow of fluid in said channel will cool said first thermal sensor means more than said second thermal sensor means;
   third thermal sensor means disposed in heat exchanging relation with the fluid in said channel and being substantially out of heat exchanging relation with said heater means for sensing the ambient temperature of the fluid in said channel;
   means employing the output of said third thermal sensor to control the temperature of said heater means to a predetermined elevated temperature relative to the ambient temperature of the fluid as sensed by said third thermal sensor means;
   means for comparing the output of said first and second thermal sensor means to derive an output representative of the rate of fluid flow in said channel for flow rates up to a first predetermined flow rate; and means for measuring an electrical quantity which is a function of the electrical power dissipated in said heater means to derive a second output representative of the rate of fluid flow in said channel for flow rates above said first flow rate.

5. The apparatus of claim 4 including common carrier means for supporting said heater means, said first, second and third sensor means thereon.

6. The apparatus of claim 5 wherein said common carrier means is apertured in the region thereof between said first and third thermal sensor means for thermally isolating said third thermal sensor means from said heater means.

* * * * *